United States Patent [19]
Joo

[11] Patent Number: 5,488,449
[45] Date of Patent: Jan. 30, 1996

[54] INFINITE-DISTANCE DETECTING CIRCUIT FOR AN AUTO-FOCUS SYSTEM

[75] Inventor: Ho-gul Joo, Seoul, Rep. of Korea

[73] Assignee: Samsung Electronics Co., Ltd., Suwon, Rep. of Korea

[21] Appl. No.: 180,082

[22] Filed: Jan. 11, 1994

[30] Foreign Application Priority Data

Jan. 11, 1993 [KR] Rep. of Korea ............ 93-244

[51] Int. Cl.$^6$ .................................. G03B 13/36
[52] U.S. Cl. ............................. 354/402; 327/72
[58] Field of Search .................. 327/72, 68, 73; 354/400, 402, 195.1, 403; 348/345; 356/1, 4; 324/98

[56] References Cited

U.S. PATENT DOCUMENTS 4,616,264 10/1986 Pshtissky ................... 354/402
4,897,857 1/1990 Wakatsuki et al. .............. 327/72 X Primary Examiner—W. B. Perkey
Attorney, Agent, or Firm—Stephen R. Whitt; Robert A. Westerlund; Charles R. Donohoe

[57] ABSTRACT

An infinite-distance detecting circuit for use in an auto-focusing system in a camera including an amplifier section for amplifying a position detection signal, a reference signal generation section sampling the position detection signal, holding the sample as a reference signal level, and amplifying the reference signal level in accordance with a variable gain in order to generate the infinite-distance-determining reference signal, and a comparator comparing the infinite-distance-determining reference signal to the amplified position detection signal in order to detect an infinite focus distance.

3 Claims, 2 Drawing Sheets

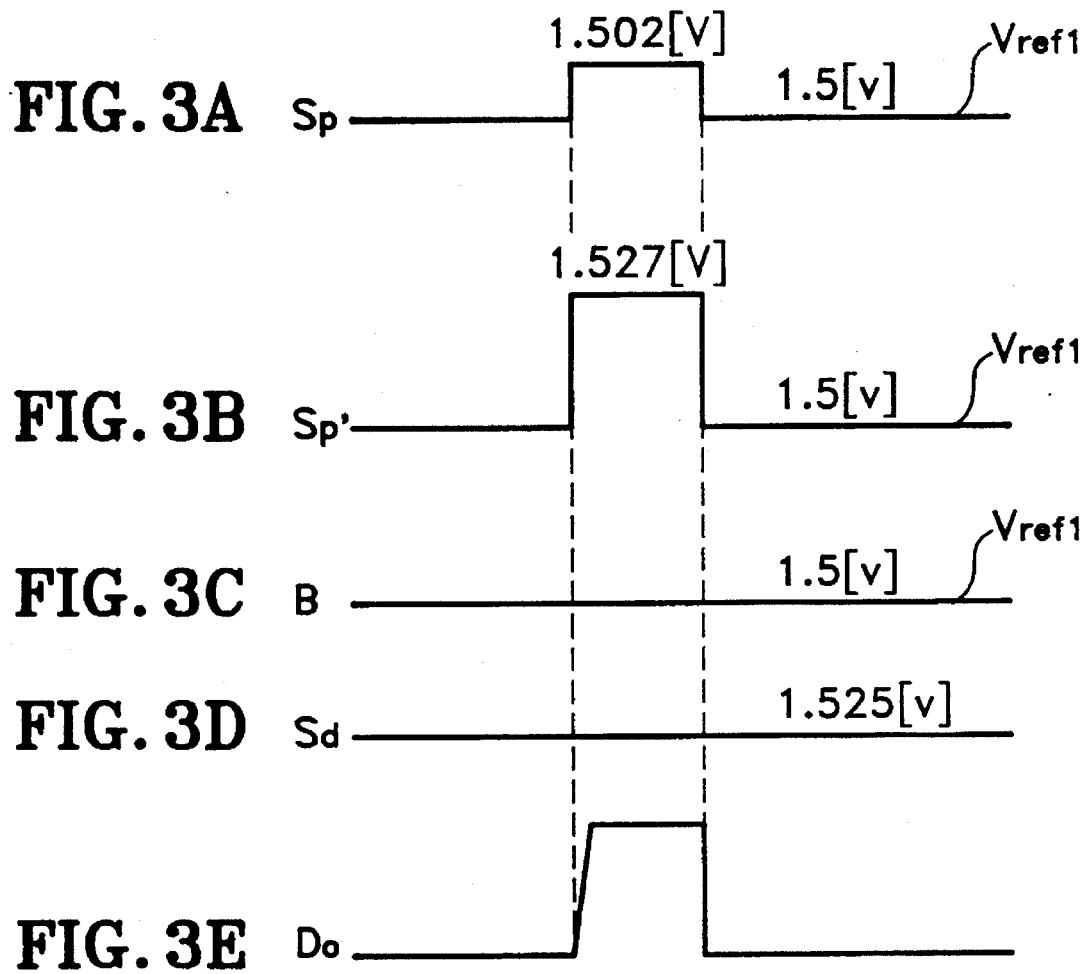

INFINITE-DISTANCE DETECTING CIRCUIT FOR AN AUTO-FOCUS SYSTEM

BACKGROUND OF THE INVENTION

The present invention relates to an auto-focus system, and more particularly, to a camera, camcorder, or similar apparatus incorporating an infinite-distance detecting circuit within an auto-focus system, such that the auto-focus system can precisely determine whether a "to-be-photographed" object is beyond a predetermined "infinite" focusing distance.

As typically employed in a camera, an auto-focus system accomplishes automatic focusing by detecting the distance between an object to the camera, and by adjusting the condition of the camera lens in accordance with the detected distance. In order to "detect" an object-to-camera distance, the auto-focus system typically emits a light beam, receives a portion of the light beam reflected from the object, and converts the reflected light beam portion into an corresponding electrical signal. The object-to-camera distance is detected by determining the relative magnitude of the resulting electrical signal.

The foregoing detection function is generally performed by a position status detector which is well known in the art. Upon detecting the object-to-camera distance, the position status detector generates a position detection signal $S_p$. If the detected object-to-camera distance exceeds a predetermined "infinite" distance (for instance, eight meters), the auto-focus system recognizes the object-to-camera distance as being an "infinite" distance for focusing purposes.

FIG. 1 shows a conventional infinite-distance detecting circuit. The circuit shown in FIG. 1 includes an amplifier 5 having first and second inputs. Position detection signal $S_p$ is applied to the first input of amplifier 5 via an input 1. An input reference voltage $V_{ref}$ is applied to the second input of amplifier 5, such that the position detection signal $S_p$ is amplified in accordance with the ratio of selected resistors R1 and R2. The circuit further includes comparator 6 having a reference voltage potential largely established by the values of Zener diede $ZD_1$, and resistors R4 and R5. Thus, the output of amplifier 5 is compared to a reference voltage potential at comparator 6 which generates a logical output, $D_o$, of either "high" or "low" at output 2, depending on the relative levels of amplifier output and the reference voltage potential. Unfortunately, differences between $V_{ref}$ and the reference voltage potential create variations in the actual levels of the position detection signal interpreted as distance values exceeding the predetermined "infinite" distance. This imprecise detection of the "infinite" distance brought about by errant voltage tolerances degrades performance of the auto-focus system.

SUMMARY OF THE INVENTION

It is therefore an object of the present invention to provide an improved infinite-distance detecting circuit for use in an auto-focus system, said circuit being capable of precisely detecting the presence of a position detection signal indicative of an "infinite" focusing distance. It is a further object of the present invention to provide an infinite-distance detecting circuit which solves the problem created by differences between $V_{ref}$ and the reference voltage potential of the comparator circuit. This object is accomplished using a circuit which samples the amplified position detection signal, holds the sample as a reference signal level, and subsequently uses this reference signal level to determine the presence of an "infinite" focus distance.

To accomplish the foregoing objects, the present invention provides an infinite-distance detecting circuit for use in a camera auto-focusing system which receives a position detection signal from a position status detector, the position detection signal varying in accordance with an object-to-camera distance, wherein the circuit comprises; an amplifier section receiving and amplifying the position detection signal, a reference signal generation section sampling the amplified position detection signal, holding the sample as a reference signal level, and amplifying the reference signal level to produce an infinite-distance-determining reference signal, and a comparator comparing the amplified position detection signal with the infinite-distance-determining reference signal, and producing an output indicative of whether the position detection signal is less than a predetermined reference value.

BRIEF DESCRIPTION OF THE DRAWINGS

The above objects and other advantages of the present invention will become more apparent upon consideration of a preferred embodiment of the present invention with reference to the attached drawings in which:

FIGS. 3A–3E are waveforms present at the respective components of the circuit shown in FIG. 2.

DETAILED DESCRIPTION OF THE INVENTION

Figure 1:
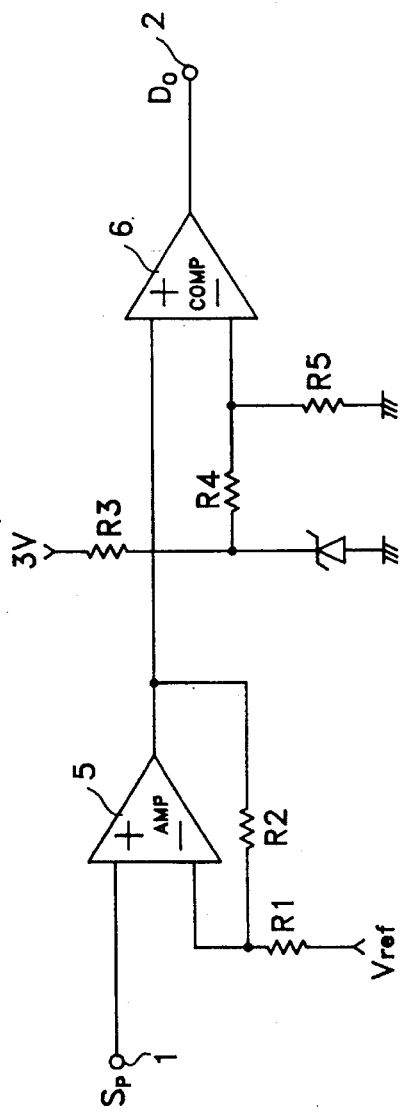
FIG. 1 is a circuit diagram of a conventional infinite-distance detecting circuit for a camera.
Figure 2:
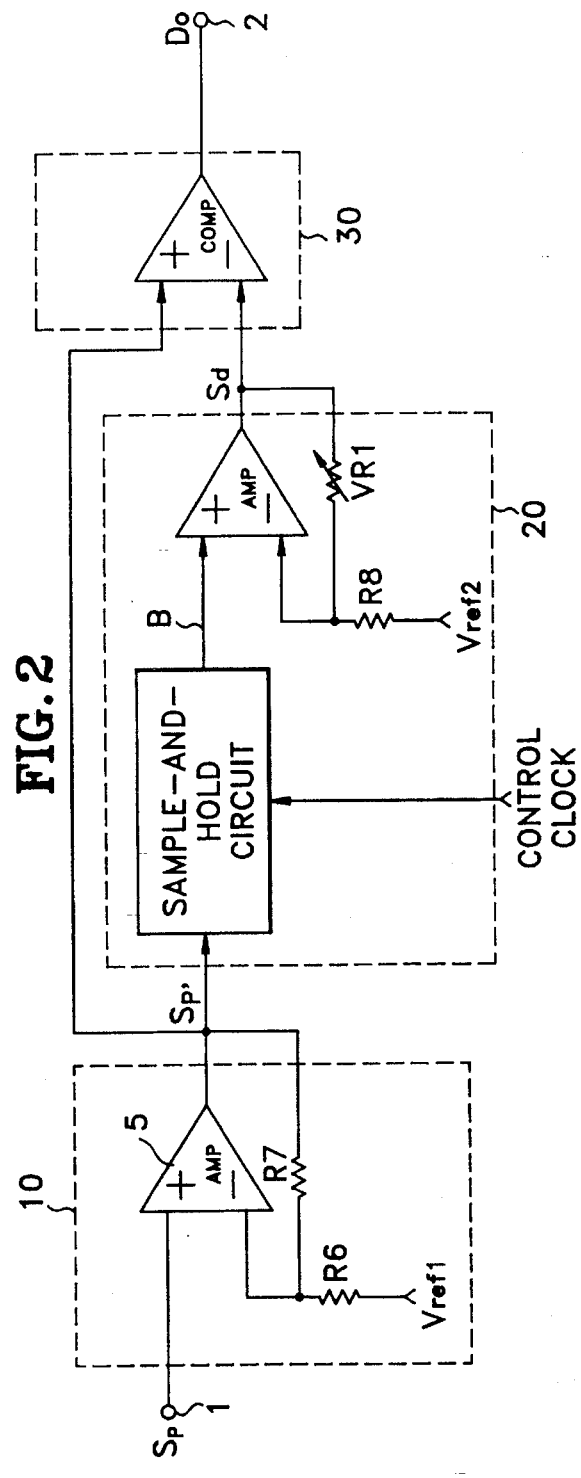
FIG. 2 is a circuit diagram of one embodiment of an infinite-distance detecting circuit for an auto-focusing system of the present invention.

FIG. 2 illustrates an infinite-distance detecting circuit for use in an auto-focus system according to the present invention. The infinite-distance detecting circuit comprises an amplifier section 10, an reference signal generation section 20, and a comparator 30. Within a camera, camcorder, or similar device incorporating the present invention, a position status detector (not shown) detects the object-to-camera distance and generates position detection signal $S_p$. Position detection signal $S_p$ is then applied to amplifier section 10 of the infinite-distance detecting circuit via a conventional current-to-voltage converter (also not shown).

Within amplifier section 10 a first reference voltage $V_{ref1}$, which may be the same reference voltage as that applied to the position status detector, is applied to a first input of an amplifier 5. Amplifier 5 of the amplifier section 10 also receives position detection signal $S_p$ at a second input. The magnitude of $S_p$ corresponds to the value of the object-to-camera distance. The magnitude of $S_p$ is usually very low, but it is often greater than the first reference voltage $V_{ref1}$ by a value of from several millivolts to a volt or two.

If a voltage level equal to the first reference signal, $V_{ref1}$, applied to the position status detector and amplifier 5 is selected as a reference, the magnitude of $S_p$ will vary in accordance with the object-to-camera distance detected. This predetermined reference voltage is, like $S_p$, very low. Thus, for a preselected "infinite" distance, for example eight meters, at which the auto-focusing system will determine that the detected object-to-camera distance is "infinite," the position detection signal $S_p$ will generally be slightly higher than first reference voltage $V_{ref}$ by about 2–5 mV. Thus, if a uncompensated voltage difference exists between the amplified position detection signal $S_p$, expressed as $S_{p'}$, and the reference voltage potential (also called an infinite-distance-determining reference signal $S_d$), it is difficult, if not impossible, to precisely determine the presence of a position detection signal indicative of an "infinite" focus distance. In order to compensate any voltage difference, the present invention acquires a reference signal level B from the amplified position detection signal $S_{p'}$. That is, the output of amplifier 5 is sampled, held, and used as the reference signal level to generate the infinite-distance-determining reference signal $S_d$.

In operation, amplifier 5 amplifies the position detection signal $S_p$ by a gain factor determined by the ratio of resistors R6 and R6, so long as the voltage of $S_p$ remains above the first reference voltage $V_{ref1}$. The output of amplifier section 10 is then applied to reference signal generation section 20 and to comparator 30.

Reference signal generation section 20 includes a sample-and-hold circuit 22 which receives the output of amplifier section 10 according to a control clock input provided by a conventional control clock generator (not shown). Thus, $S_{p'}$ is sampled and the resulting reference signal level, B, is held and applied to a first (non-inverting) input of an amplifier 24. Amplifier 24 receives at a second (inverting) input second reference voltage $V_{ref2}$ and amplifies the output of sample-and-hold circuit 22 by a gain factor determined by a variable resistor VR1 and a resistor R8. Second reference voltage is typically lower than first reference voltage $V_{ref1}$. Variable resistor VR1 can be adjusted to obtain a desired magnitude for the infinite-distance-determining reference signal $S_d$.

Comparator 30 receives the output of amplifier section 10 (i.e., $S_{p'}$) at a first (non-inverting) input and infinite-distance-determining reference signal $S_d$ at a second (inverting) input. If $S_{p'}$ is greater than $S_d$, comparator 30 produces a logical "high" at output 2. If, however, $S_{p'}$ is less $S_d$, comparator 30 produces a logical "low" at output 2.

FIG. 3A illustrates the waveform of position detection signal $S_p$ as applied to input 1. As shown, the peak of the pulse waveform $S_p$ (for example, 1.502 V) is greater than the level the first reference voltage $V_{ref1}$ by 2 mV. In reality, $S_p$ varies in accordance with to the detected object-to-camera distance, but in FIG. 3A the illustrated waveform represents an instantaneous view of the position detection signal.

FIG. 3B illustrates the waveform of the amplified position detection signal $S_{p'}$. As shown, $S_{p'}$ is higher than first reference voltage $V_{ref1}$ by 27 mV.

FIG. 3C illustrates the output of the sampled and held reference signal level B. In the illustrated example, the reference signal level B is equal to the first reference voltage $V_{ref1}$.

FIG. 3D illustrates the waveform of the infinite-distance-determining reference signal $S_d$. This signal is derived from the sampled and held reference signal level B shown in FIG. 3C which is amplified in accordance with the gain established by the setting of variable resistor VR1. In the illustrated example, signal of FIG. 3C has been amplified above the first reference voltage $V_{ref1}$ by 25 mV.

FIG. 3E illustrates the waveform of an output signal $D_o$ produced at output 2. For the illustrated example, the amplified position detection signal $S_{p'}$ (27 mV+$V_{ref1}$) is greater than infinite-distance-determining reference signal $S_d$ (25 mV+$V_{ref1}$). Accordingly, comparator 30 produces a "high" output indicating that the object-to-camera distance is less than the "infinite" focus distance, that is, within eight meters. Conversely, if the amplified position detecting signal $S_{p'}$ is less than infinite-distance-determining reference signal $S_d$, then comparator 30 produces a "low" output indicating that the object-to-camera distance is greater than the "infinite" focus distance, that is, beyond eight meters.

As described above, the infinite-distance detecting circuit of the present invention, which is employed in an auto-focus system in a camera, camcorder, or similar device, precisely determines the presence of a reference signal level indicating an "infinite" focus distance. In other words, detection is performed without the errors occasioned by uncompensated differences in internal circuitry voltages. Those of ordinary skill in the art will appreciate the preferred embodiment described above is susceptible to routine design considerations, including circuit modifications and variations. The preferred embodiment is given by way of example, and the invention recited in the attached claims is not limited to the illustrative embodiment.

What is claimed is:

1. An infinite-distance detecting circuit for use in a camera auto-focus system which receives a position detection signal from a position status detector, said position detection signal varying in accordance with an object-to-camera distance, and said circuit comprising:

an amplifier section receiving and amplifying said position detection signal;

a reference signal generation section sampling said amplified position detection signal, holding said sample as a reference signal level, and amplifying said reference signal to produce an infinite-distance-determining reference signal; and a comparator comparing said amplified position detection signal with said infinite-distance-determining reference signal, and producing an output indicative of whether the position detection signal is less than a predetermined reference value.

2. The infinite-distance determining circuit of claim 1, wherein said amplifier section includes an amplifier having first and second inputs, said first input receiving said position detection signal, and said second input receiving a first reference voltage, such that said position detection signal is amplified when said position detection signal is greater than said first reference voltage.

3. The infinite-distance determining circuit of claim 1, wherein said reference signal generation section comprises:

a sample-and-hold circuit for sampling said amplified position detection signal in accordance with a control clock signal; and an amplifier having first and second inputs and having a variable resistor for adjusting the gain of said amplifier, said first input receiving said reference signal level, and said second input receiving a second reference voltage.

* * * * *